United States Patent [19]
Doxsey et al.

[11] Patent Number: 5,317,338
[45] Date of Patent: May 31, 1994

[54] VISUAL MEASUREMENT TECHNIQUE AND TEST PATTERN FOR APERTURE OFFSETS IN PHOTOPLOTTERS

[75] Inventors: William I. Doxsey, Poughkeepsie; John J. Masten, Jr., deceased, late of Poughkeepsie, by Barbara C. Masten, administratrix; Richard M. Schroedl, Wappingers Falls; Donald G. Will, Poughkeepsie, all of N.Y.

[73] Assignee: International Business Machines Corporation, Armonk, N.Y.

[21] Appl. No.: 787,305

[22] Filed: Oct. 29, 1991

[51] Int. Cl.$^5$ .............................................. G01D 9/00
[52] U.S. Cl. ........................................ 346/1.1; 354/4
[58] Field of Search ............... 346/1.1, 107 R; 354/4, 354/15, 12; 355/32, 40, 67; 356/401, 399

[56] References Cited

U.S. PATENT DOCUMENTS

| | | |
|---|---|---|
| 3,330,182 | 10/1965 | Gerber et al. |
| 3,548,713 | 12/1970 | Webster ................ 355/67 X |
| 3,610,125 | 12/1966 | Touchy. |
| 3,673,937 | 7/1972 | Mader. |
| 3,704,655 | 12/1972 | Fryklund et al. |
| 3,724,347 | 4/1973 | Gerber. |
| 4,249,807 | 2/1981 | Webster et al. ........... 354/4 |
| 4,343,540 | 8/1982 | Berdat ..................... 354/4 |
| 4,395,116 | 7/1983 | Patton, III et al. ....... 355/32 |
| 4,416,522 | 11/1983 | Webster .................. 354/4 |
| 4,473,293 | 9/1984 | Phillips ................... 355/53 |
| 4,538,914 | 9/1985 | Yomoda et al. ........ 356/401 X |
| 4,568,189 | 2/1986 | Bass et al. .............. 356/401 |
| 4,675,702 | 6/1987 | Gerber .................. 346/107 R |
| 4,685,807 | 8/1987 | Picard .................. 356/401 |
| 4,748,456 | 5/1988 | Luoma et al. ......... 346/107 R |
| 4,757,327 | 7/1988 | Henzi ................... 346/1.1 |
| 4,801,808 | 1/1989 | Hamasaki ............. 356/401 |
| 4,841,316 | 6/1989 | Pavone et al. .......... 354/4 |
| 4,918,320 | 4/1990 | Hamasaki et al. ..... 346/401 X |
| 5,166,754 | 11/1992 | Suzuki et al. ......... 356/401 |

FOREIGN PATENT DOCUMENTS

| | | |
|---|---|---|
| 0286223 | 12/1987 | Japan .................... 356/401 |
| 0001901 | 1/1989 | Japan .................... 356/401 |
| 0155620 | 6/1989 | Japan .................... 356/401 |
| 0076214 | 3/1990 | Japan .................... 356/401 |
| 0294014 | 12/1990 | Japan .................... 356/401 |

*Primary Examiner*—A. T. Grimley
*Assistant Examiner*—Sandra L. Brase
*Attorney, Agent, or Firm*—Whitham & Marhoefer

[57] ABSTRACT

A test pattern including an aperture image and a line image including a plurality of parallel lines, forming a measurement graticule, overlapping the aperture image, permits determination of dimensions for correction of alignment of image centerlines by inspection rather than complex measurement with stationary optical instruments. Since the line pattern preferably includes a plurality of parallel lines of predetermined width and separated by a predetermined spacing, the line image can be made to overlie the aperture image without obscuring features of the aperture image which are significant to determination of the alignment correction dimension.

6 Claims, 2 Drawing Sheets

VISUAL MEASUREMENT TECHNIQUE AND TEST PATTERN FOR APERTURE OFFSETS IN PHOTOPLOTTERS

BACKGROUND OF THE INVENTION

1. Field of the Invention

The present invention generally relates to photoplotters and, more particularly, to alignment of exposure apertures in Gerber vector photoplotters.

2. Description of the Prior Art

Many modern manufacturing processes, particularly processes for fabricating electrical circuits, involve the production of intricate patterns of high accuracy. In particular, the production of masks for electronic and integrated circuits requires very accurate and complex patterns to be formed for the purpose of exposing photosensitive resists and the like.

For the creation of these patterns, the so-called Gerber vector photoplotter, manufactured by the Gerber Scientific Instrument Co. of South Windsor, Conn., has become widely used in the industry. Gerber vector photoplotters typically have an exposure head, an exposure table and a mechanism for causing an exposure head to move relative to the table with high speed and accuracy in two orthogonal directions. In more recent designs of such photoplotters, it is more usual to provide for movement of the table while holding the exposure head stationary to prevent the delicate optics of the head from being subjected to large acceleration loads. Thus, under computer control 30, the photoplotter can expose selected areas of a photosensitive medium at any location on the exposure table. Additional details of Gerber vector photoplotters may be found in U.S. Pat. Nos. 3,330,182 to Gerber et al, 3,724,347 to Gerber, 4,249,807 to Webster and 4,416,522 to Webster.

As particularly disclosed in U.S. Pat. No. 3,724,347 to Gerber, the exposure head of the photoplotter is typically divided into two sections. These two divisions are each optimized to produce the exposure of areas by either scanning the head over the area to be exposed, such as in line drawing, or by illuminating the entire area of a shape defined by a mask while the head is held stationary. This latter mode of operation is commonly referred to as flashing. Accordingly, these divisions are commonly referred to as a "line side" 32 and an "aperture 34 side" 34, respectively.

Since the pattern to be exposed will consist of geometric shapes, typically to form connection pads and lines to connect the pads, this division is for the purpose of producing the two types of images with greatest efficiency and accuracy. The pads can then be shaped in accordance with the shape of an aperture to avoid the need for movement of the head or table to develop the desired shape. Lines can be more efficiently exposed when the head or table is moved. As is known in the art, exposure profile across the width of a line can be affected by aperture shape; the dimension of the aperture in the direction of line drawing determining the effective exposure time (a circular aperture, for example, would produce reduced exposure at the edges of the line). Annular apertures for correction of the exposure across the width of lines are disclosed in greater detail in U.S. Pat. No. 3,548,713 to R. B. Webster. However, it is now common to use blade apertures in the line side of the photoplotter since the presently available photosensitive materials may easily be saturated during exposure, rendering the exposure profile relatively less important. Further, blade apertures allow for high speed adjustment of line widths under computer control as well as the capability of producing very fine lines.

Since these two portions of the exposure system in the exposure head must be used to form respective features of the same image, the geometrical relationship between the two must be accurately maintained. An offset must be developed to allow control of the positioning of the exposure head or table to exactly superimpose images formed by the two portions of the exposure head. For reasons of convenience, due to the structure of the aperture side, the aperture side is usually aligned to the line side of the photoplotter. The position (d) of the aperture on an aperture wheel which allows rapid changing of apertures will also affect the location of the aperture image and a correction (d) must be obtained for each aperture on the aperture wheel.

Apertures are typically positioned on the exposure wheel with an initial accuracy of about 1 mil, which is far less than the accuracy of which the Gerber vector photoplotter is capable. Since the aperture wheel extends into the optical system of the aperture side of the head, access is difficult for fine adjustment of aperture position on the aperture wheel. Therefore, it is customary to produce fine positional correction by adding or subtracting (e.g. at 36 of FIG. 3) orthogonal correction distances to a base compensation dimension 38 corresponding to the distance between the two sides of the exposure head. An arrangement for association of dimensional corrections as well as exposure controls with each aperture is disclosed in detail in U.S. Pat. No. 4,343,540 to Berdat.

In the past, these correction distances were determined by making a test exposure including a base line feature and an aperture image. Such a test exposure is made by exposing areas of a photosensitive medium, such as sheet film and developing the film to yield images for analysis. These images must be spaced by a small distance so that the centerline of each image can be optically determined by inspection of the image produced. For example, if the aperture image falls within or overlaps the base line image to any substantial degree, the centerline of the aperture image cannot be readily determined. The separation of the aperture and the base line images was typically on the order of 0.0001 inches to insure that no overlap occurred.

However, to exploit the accuracy available from the Gerber vector photoplotter, this separation of the centerlines of the images must be measured to a very high accuracy, on the order of 0.00002 inches, or about 1 part in 5 of the separation distance. While this ratio is as small as is considered practical, the separation distance itself introduces some uncertainty into the measurement. Further, such accuracy requires the use of large, stationary optical equipment and requires substantial time for the measurement to be made. When this time must be expended for two orthogonal directions for each of the many apertures of the photoplotter, the cost of operation of the photoplotter is greatly increased both in "down time" when apertures must be substituted and in labor costs of highly trained personnel to perform the measurement and enter the correction in the computer which controls the photoplotter. More importantly, perhaps, the measurement process is subject to error and an erroneous result may result in a defective pattern or even a run of defective manufactured parts.

SUMMARY OF THE INVENTION

It is therefore an object of the present invention to provide a technique and test pattern which will allow measurement of correction dimensions which is less subject to error, does not require the use of stationary optical measurement equipment and can be performed quickly and easily by less highly trained personnel while maintaining or improving the accuracy of the measurement.

In order to accomplish the above and other objects of the invention, a method of operating a photoplotter is provided including the steps of forming an aperture image having a centerline, forming a pattern image overlapping said aperture image, the test pattern image including a measurement graticule having a centerline, determining the distance from the centerline of measurement graticule to the centerline of said aperture image from said measurement graticule, and controlling the photoplotter to superimpose a centerline of the aperture image on a centerline of an image produced by a line side of the photoplotter which corresponds to said centerline of said test pattern image.

In accordance with another aspect of the invention, a test pattern is provided formed by the process of forming a first image having a centerline, and forming a second image overlapping the first image, the second image including a measurement graticule and a centerline whereby a distance from the centerline of the first image to the centerline of the second image can be determined by inspection.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
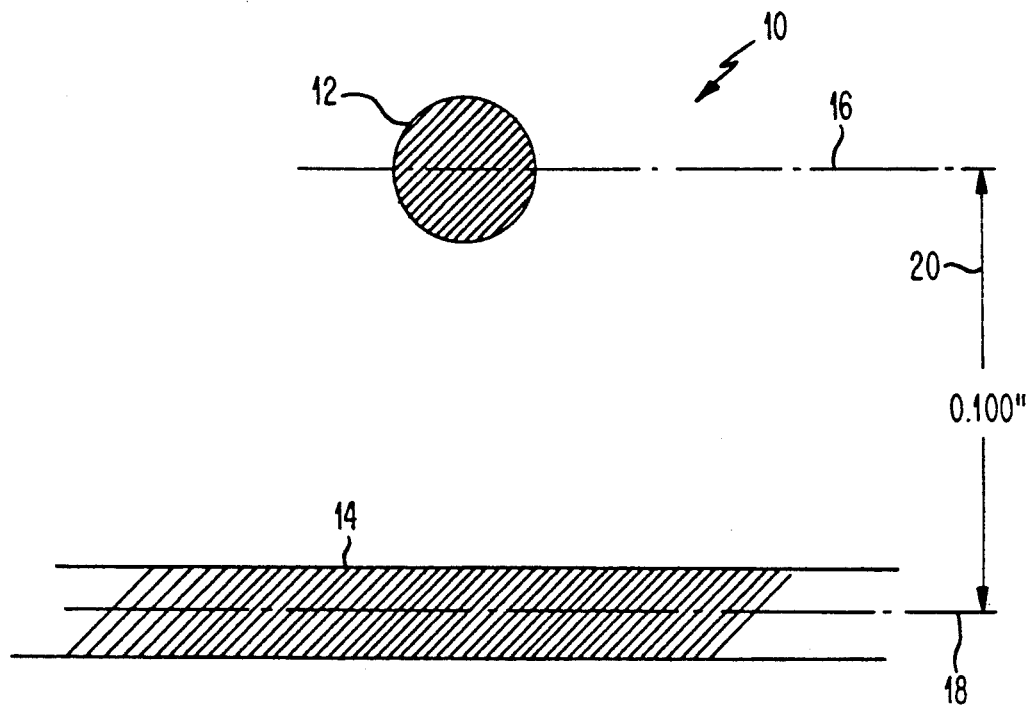
FIG. 1 is a test pattern including a baseline and an aperture image according to the prior art.
Figure 2:
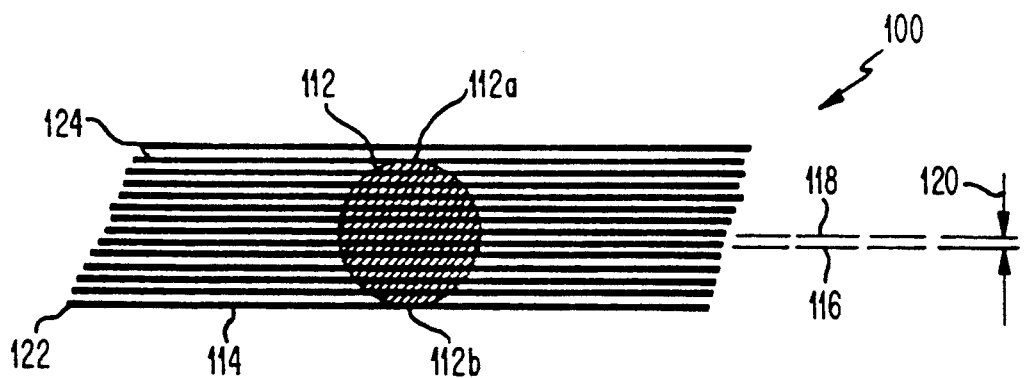
FIG. 2 is a test pattern in accordance with the methodology of the present invention.
Figure 3:
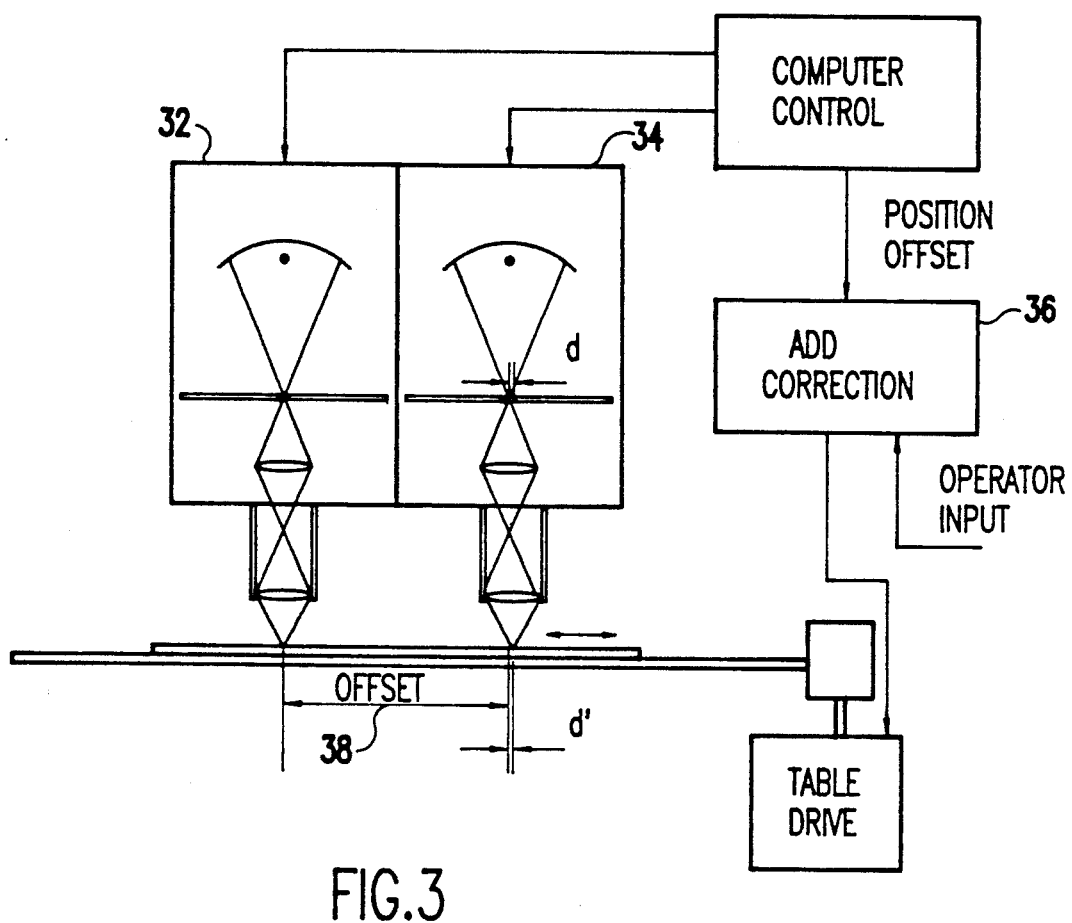
FIG. 3 is a schematic illustration of an exposure head and movable exposure table of a photoplotter.

Referring now to the drawings, and more particularly to FIG. 1, there is shown a test pattern 10 in accordance with the prior art, consisting of an aperture image 12 and a baseline image 14. The respective centerlines of these images 16, 18 are separated by a distance 20 which is nominally 0.100 inches. In the prior art, dimension 20 was accurately measured and an variation from the nominal value was used as the correction value.

In contrast, the present invention exploits the ability of the Gerber vector photoplotter to produce a pattern of fine lines to produce a test pattern 100 which includes a measurement graticule. The measurement graticule preferably is formed by a pattern of fine lines 114 each having a predetermined width (e.g. 0.0005 inches) and a predetermined separation (e.g. 0.0005 inches). Therefore, the number and location of the lines is, itself, an accurate measurement of distance. Equal width of lines 122 and separations 124 is preferred for simplicity, as is the decimal sum of the width and separation (e.g. 0.001 inches). Use of an odd number of lines is preferred so that the center of a particular line will be the centerline of the test pattern. Thus a coarse estimate of the centerline of the aperture image 116 and the centerline of the test pattern 118 may be obtained by merely counting the test pattern lines to directly obtain the correction dimension 120 which is comparable to the accuracy which can be obtained with stationary measurement equipment because of the necessarily large value of nominal image separation dimension 20 of the prior art.

It has been found in practice, since most apertures are symmetrical, that the width of the lines does not reduce the ability to distinguish the centerline of the aperture image since the edges 112a and 112b, where they intercept particular lines of the test pattern 114 can be used to provide a fine adjustment of the coarse estimate of centerline location which can be obtained by merely counting the lines on either side of the aperture image 112. The shallow angle formed at the edges of a circular aperture image allows the separation of the points where the edges of the aperture image intersect the edge of a line to be used as an indicator of the size of the fine adjustment, particularly where the diameter of the aperture image is an integral multiple of the sum of the line width and separation. Thus, by mere inspection with a microscope, the correction dimension can usually be determined to an accuracy of 0.1 mil or about half of the minimum line width and separation which can be produced on a particular photoplotter. This particularly contrasts with the prior art where the centerline of the aperture image could not readily be determined if the aperture image 12 and baseline image 114 were to overlap. Since the images are superimposed, in accordance with the invention, no error or uncertainty due to image separation distance can occur.

It is to be understood that the test pattern may be altered, as desired, from the preferred form described above as long as the line width and spacing is sufficiently regular to provide an accurate indication of distance in the direction transverse to the lines. For instance, the middle three of five lines of the test pattern could be made more narrow or more closely spaced or both to provide a more convenient indication of the centerline of the line portion of the test pattern. The test pattern can also be scaled to any aperture image size or to match the feature size or other criteria of the product to be manufactured.

In view of the above, it is seen that the invention provides for measurement of aperture alignment in a photoplotter which is of comparable or greater accuracy than the prior art methodology and which can be performed more quickly and by less highly trained personnel without the use of stationary optical measurement equipment.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of operating a photoplotter having a line side and an aperture side for respectively forming line images and aperture images, said method including the steps of forming an aperture image having a centerline, forming a test pattern image overlapping said aperture image, said test pattern image including a measurement graticule having a centerline, determining the distance from said centerline of said measurement graticule to said centerline of said aperture image from said measurement graticule, and controlling said photoplotter to superimpose said centerline of said aperture image on a centerline of an image produced by said line side of said photoplotter which corresponds to said centerline of said test pattern image.

2. A method as recited in claim 1 wherein said measurement graticule of said test pattern image is formed by forming an image which includes a plurality of parallel lines having predetermined widths and predetermined spacings.

3. A method as recited in claim 2, wherein said parallel lines are formed by forming lines having a predetermined width equal to a predetermined spacing between said parallel lines.

4. A test pattern formed by the process of forming a first image having a centerline, and forming a second image overlapping said first image, said second image including a measurement graticule and a centerline whereby a distance from said centerline of said first image to said centerline of said second image can be determined by inspection.

5. A test pattern as recited in claim 4, wherein said measurement graticule of said second image is formed by forming an image of a plurality of parallel lines, said parallel lines having predetermined widths and predetermined spacings therebetween.

6. A test pattern as recited in claim 5, wherein said parallel lines are formed by forming lines having a predetermined width equal to a predetermined spacing between said parallel lines.

* * * * *